May 24, 1960 W. EIRICH ET AL 2,937,815

DISC MILLS

Filed July 10, 1957 5 Sheets-Sheet 1

INVENTORS
Wilhelm Eirich
Gustav Eirich

By: Bailey, Stephens + Huettig
Attorneys

INVENTORS
Wilhelm Eirich
Gustav Eirich
By: Baily, Stephens & Huettig
Attorneys

May 24, 1960 W. EIRICH ET AL 2,937,815

DISC MILLS

Filed July 10, 1957 5 Sheets-Sheet 3

INVENTORS
Wilhelm Eirich
Gustav Eirich
By: Bailey, Stephens & Huettig
Attorneys

INVENTORS
Wilhelm Eirich
Gustav Eirich
By: Bailey, Stephens & Huettig
Attorneys

May 24, 1960 W. EIRICH ET AL 2,937,815

DISC MILLS

Filed July 10, 1957 5 Sheets-Sheet 5

INVENTORS
Wilhelm Eirich
Gustav Eirich
By: Baily, Stephens & Huettig
Attorneys

United States Patent Office 2,937,815
Patented May 24, 1960

2,937,815

DISC MILLS

Wilhelm Eirich, Walldurnerstr. 41, and Gustav Eirich, Bahnhofstr. 19, both of Hardheim, Nordbaden, Germany Filed July 10, 1957, Ser. No. 670,988

Claims priority, application Germany July 11, 1956

7 Claims. (Cl. 241—257)

This invention relates to disc mills.

In the crushing art, the use of ribbed disc mills or toothed disc mills has been known for decades, but their use has been restricted to soft-friable or tough and fibrous material. For crushing hard materials, particularly material such as coke, hard crushing machines have been exclusively employed which include primarily roller mills, ball mills, vibratory mills and disc mills having solid corundum discs, and secondly hammer mills or pin mills. The throughputs of hard crushing mills, however, is relatively low because they have a relatively low number of revolutions. In addition, these mills require considerable power.

By the invention it is possible to use a disc mill known per se, but used only for soft crushing or shredding, for hard crushing. Such disc mills have an extremely high hourly output by reason of their particularly high speed. The disc mills hitherto employed, however, are unsuitable for hard crushing, because the cutting ribs are subject to much too rapid wear despite the fact that they are constructed of hard steel. Experiments with disc mills in which the discs were fitted with ribbed plates consisting of various, very hard tool steel alloys, have also hitherto been unsuccessful.

It has surprisingly been found that the existing difficulties can be overcome, and a disc mill for crushing particularly hard materials can be employed, if there is used in the construction thereof a material which has not heretofore been employed in the construction of disc mills because of technical prejudices. According to the invention there is provided a disc mill having two discs rotatable with respect to one another to form a grinding zone at least over part of their adjacent surfaces, said surfaces being at least partially covered with a hard metal coating comprising a layer of hard metal alloy having embedded splinters of metal carbide of high melting point and cobalt.

The hard-steel grinding plates hitherto used soon become smooth on the surface when the disc mill is regularly employed, whereby the passage of the material to be ground through the grinding zone is accelerated and the transit time is reduced. This disadvantage inherent in plane disc mills may be avoided by a mill embodying the invention. The hard material passing through the grinding zone tends to wash away the hard metal alloy lying between the individual hard splinters, whereby the grinding zone is maintained rough and its gripping properties are maintained by the remaining hard splinters. It is even possible to vary the gripping properties within wide limits in accordance with the requirements of the material to be treated. This may be effected, for example, by the choice of the grain size of the splinters embedded in the hard metal alloy, from powder form up to a maximum size of 7 mm., and in addition by a suitable choice of the weldable hard metal employed as binding agent. A third possibility lies in an appropriate shaping at the working zone.

In a disc mill embodying the invention, which is designed more especially for comminuting dry material or material mixed with a large amount of water, the working zone may, for example, be made completely plane and may merely support the hard metal coating with embedded splinters.

The hard metal coatings may be autogenously welded to the plane disc plates together with the embedded splinters.

In order that the hard metal may not be too rapidly washed away between relatively coarse embedded splinters, in which case the coarse projecting splinters would not be fully effective because they would lose their hold in the hard metal layer before becoming blunt, fine pulverous splinters may be embedded in the hard metal in addition to the coarse-grained splinters. Washing-out of the hard metal between the coarse working splinters is thereby so far retarded that the coarse projecting splinter only loses its hold in the hard metal when it has been substantially worn away.

In a mill embodying the invention it is possible to minimize difficulties occurring in the construction of the mill itself which are due to the constant need for renewal of the gripping capacity of the working coating. It has been found, for example, that in the case of plane disc mills having grinding segments mounted thereon, the rapidly rotating discs are bent over somewhat at the edge at high speeds, in such manner that the distance between the two discs in the ribbed zone is increased. In order nevertheless to grind the material finely, it has hitherto been necessary to readjust the distance between the discs. However, this involves the danger that, on switching-off or involuntary stoppage of the mill, the opposite parts of the grinding zone of the two discs rub one into the other. If the two discs are coated with a hard metal having embedded splinters in the grinding zone the danger exists that, in the event of the discs rubbing one into the other, these coatings, or the segments by which they are supported, may be forced out of the disc or the projecting hard splinters may at least flake off. In order to avoid this the hard metal coatings may be provided in the grinding zone as segments which are detachably connected to one face of the mill disc by means of securing pins, for example screw bolts, a counter-weight ring being provided on the other face of the mill disc. Thus, even when the disc rotates at very high speed, it is not bent over at its edge, i.e. the distance between the two discs does not change even at very high speeds of rotation.

There is another disadvantage which arises in known disc mills of the type comprising a fixed disc and a rapidly rotating disc and in which the material is fed through the centre point of the fixed disc, when the discs are mounted in a vertical plane. Because of the action of centrifugal force the lower part of the ribbed rim or the whole grinding zone of the fixed disc is subjected to somewhat greater stress than the upper part, as a result of which this part becomes worn earlier than the centre part of the grinding ring. This disadvantage can be substantially reduced by disposing the two discs about a vertical axis. However, since in a mill embodying the invention a far longer period of operation before wear occurs is aimed at, and in addition it is desired to be able to deal with more hardened material than in a known disc mill, this aforesaid disadvantage arises also in mills having a vertical disc axis if the charging does not take place exactly in the direction of the axis of the discs. This disadvantage can be minimized by appropriately designing the charging device. However, the design of this device is substantially dependent upon the nature of the material to be comminuted. In the case of hard, dry material, the individual particles or fragments of material must travel perpendicularly to the rotating disc. Therefore, there is provided especially for this purpose a filling duct which is narrowed in double conical form at a short distance before the point at which it opens into the mill.

In the case of moist material, it is especially necessary that the filling duct should not be even partially obstructed. During obstruction or partial obstruction, uniform supply of the material to be comminuted over the entire periphery of the disc cannot be ensured. In order to avoid this disadvantage, the filling duct is designed in cylindrical form and there is provided on the rotating grinding disc, fingers which rotate within the filling duct at a short distance from the wall thereof. These fingers may be in the form of blades having sufficient rigidity and may, if necessary, also be provided with a hard metal coating having embedded splinters.

In the treatment of moist material to be comminuted, the great disadvantage has hitherto existed that this material forms, after comminution, a very viscous paste which cannot be removed from the mill by known clearing devices. In order to relieve the grinding disc of load and to prevent it from being warped and therefore non-uniformly loaded by the clearing blades, the latter may be mounted independently of the rotating grinding disc and may be separately driven, at a lower speed than the rotating grinding disc. Such an arrangement of the clearing blades also allows them to scrape closely the walls of the mill and thus completely convey even viscous material to the delivery aperture.

A further disadvantage of the known rapidly rotating disc mills, the importance of which is heightened by the gripping properties and roughness of the grinding zone, is that the grinding discs are heated to a very great extent and may therefore become warped. This heating occurs especially in the grinding of dry hard material. Radial fan blades are therefore preferably provided on the rear face of the rotating grinding disc in such cases, whilst a fresh air supply duct opens into the mill housing below the orbit of these blades. This fresh air constantly flowing past the rapidly rotating disc serves on the one hand to blow out the ground material, while on the other hand, since the inlet aperture for the fresh air is of constant width, the disc is sufficiently cooled by the constant strong current of air.

The radial fan blades may also be designed to convey toward the axis of the discs and be coated with hard metal having embedded splinters, while fresh air supply ducts lead into the annular baffle space outside the fixed grinding disc, and a delivery duct for the ground material is connected to the mill housing within the orbit of the fan blades. In such an embodiment, the material treated in the actual crushing zone is again thoroughly whirled in the annular baffle space outside the grinding disc by the air draught produced and is more finely comminuted.

Finally, it is particularly desirable with the very high-grade impact-sensitive hard metal coatings having embedded splinters to employ a device for adjusting the distance between the discs, which may also comprise a spring and an overload locking device for the momentary separation of the two discs in the event of overload.

For a better understanding of the invention reference will now be made to the accompanying drawings wherein.

Figure 1:
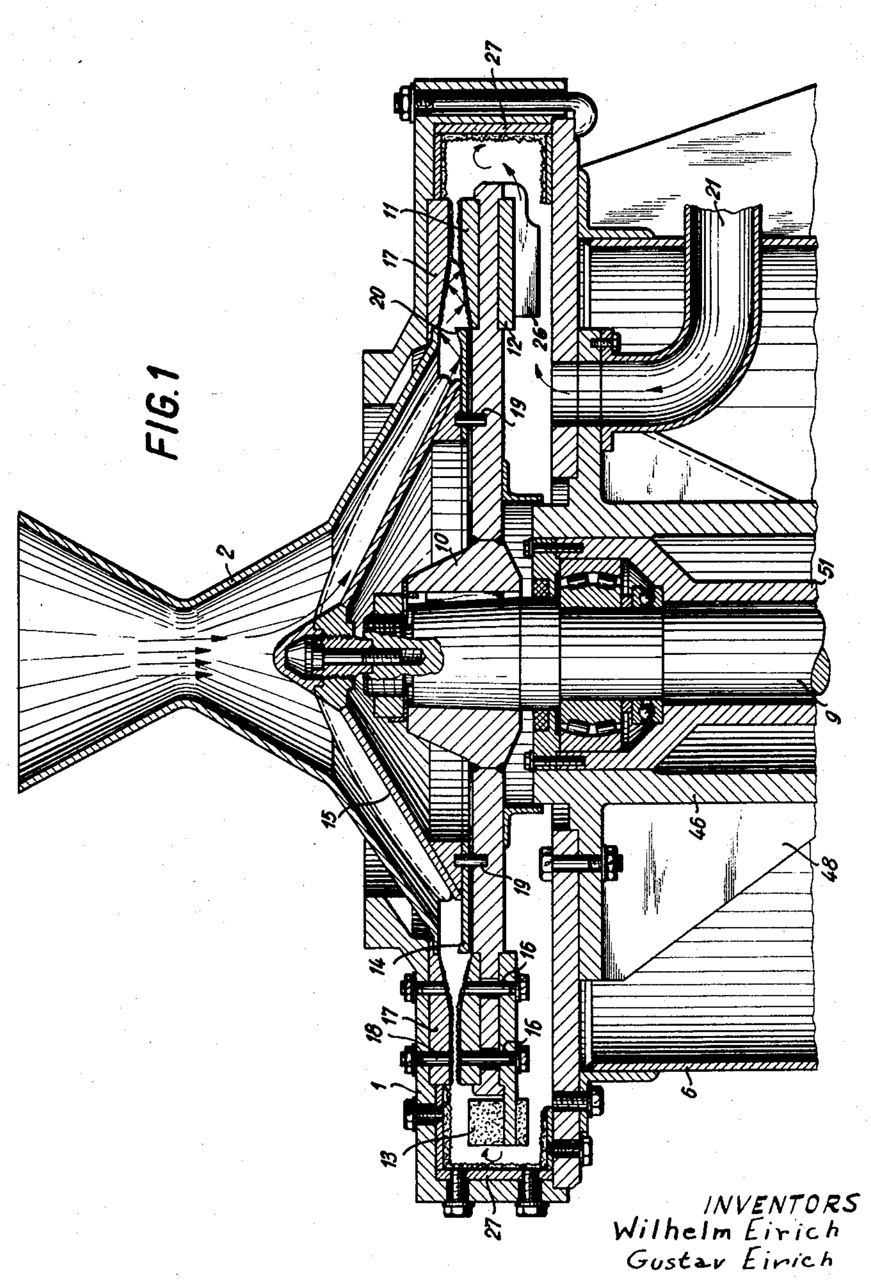
Figure 1 is a sectional view through a plane disc mill which is especially suitable for crushing non-plastic, dry or wet substances having little adhesive power.

In the embodiment shown in Figure 1, a plane disc mill is disposed in a substantially cylindrical mill housing 1, which terminates at the top in a central filling duct 2. The housing 1 is secured at the bottom to a cylindrical bearing housing 6 with sleeve 46 and flange 48 which serves at the same time to receive the driving motor for the plane disc mill. The driving motor is connected directly to a horizontally arranged rapidly rotating grinding disc 10 through a vertical driving shaft 9. The bearing housing 6 also contains a device with adjusting hose 51 for the adjustment of the distance between the rotating grinding disc and a fixed grinding disc.

The feed hopper 2 lies in prolongation of the driving shaft 9 above the rapidly rotating grinding disc. The said hopper is tapered to form a double cone at some distance above the grinding disc to ensure an exact central charging. The result of this is that the tangential and radial accelerations are initially small and then increase to the maximum peripheral velocity. Thus, no strong impact of material introduced on to a rapidly rotating grinding disc occurs. The rapidly rotating grinding disc itself is composed of a carrier disc 10, a grinding coating carrier 11 mounted thereon and a counterweight ring 12 with clearing blades 13, reinforcing rings 14 and intake cone 15. The carrier disc 10 is advantageously constructed of tough steel and fixedly mounted on the driving shaft 9. The annular grinding coating holder 11 is mounted on the top of the outer edge of the carrier disc 10, and the counter-weight ring 12 is mounted on the lower face thereof. The grinding coating carrier 11 and the counter-weight ring may consist of individual sectors which combine in each instance to form the complete ring. The grinding coating holder 11 and the counter-weight ring 12 are secured by screw-bolts 16, which are secured, for example, in the grinding coating holder 11 and engage downwards through the carrier disc 10 and the counter-weight ring 12. The counter-weight ring 12 comprises at intervals arms which extend beyond the periphery of the carrier disc 10 and to which the clearer blades 13 are secured. Disposed opposite the rapidly rotating grinding disc on the housing 1 in the region of the grinding coating carrier 11, for example by meaans of screwbolts 18, is a counter-grinding coating carrier 17. The grinding coating carrier 11 and the counter-grinding coating carrier 17 are so designed that they form an inner conically tapering pre-grinding zone and an outer main grinding zone of constant thickness. The grinding coating carrier 11 and the counter-grinding coating carrier 17 are provided over their entire surface with a grinding coating consisting of steel with embedded splinters consisting of metal carbide and cobalt of a size up to 3 to 4 mm. A favourable splinter size is about 1.5 mm. It is also possible to employ splinters of this size and at the same time to admix with the steel powder-fine splinters consisting of the same material to prevent the steel from being washed out between the larger splinters. The main grinding zone between the grinding coating carrier 11 and the counter-grinding coating carrier 17 may be completely plane, since the roughness produced by the splinters projecting from the grinding coating is sufficient to ensure a very favourable grinding effect, especially in the case of dry material or of material mixed with a very large amount of liquid.

The steel layer is considerably thicker than the dimensions of the splinters, and the splinters are scattered all through the layer, so that most of the splinters are completely embedded in the layer while only a few are exposed at the surface. Thus, as the layer wears away, fresh splinters are presented to maintain the grinding action over long periods of time.

The counter-weight ring 12 is of such dimensions and of such weight that the plane of gravity of the rapidly rotating grinding disc lies in the region of the grinding coating carrier 11 at the centre of the carrier disc 10. This has the result that the rotation of the grinding disc causes no deformation of the disc. The distance between the two discs is thereby rendered independent of the speed of rotation of the rotating disc.

Mounted within the grinding coating carrier 11 on the carrier disc 10 consisting of tough steel is an annular reinforcing plate 14 of hard metal which has on its outer edge an annular projection 20 of beak-like cross-section. This beak-like projection causes the material sliding radially over the plate 14 under the action of centrifugal force to be thrown against the stationary upper grinding plate , i.e. against the counter-grinding coating carrier 17. In accordance with the hardness of the material, it rebounds on to the rapidly rotating disc and on to the pre-grinding zone situated below it. This process is repeated with rapidly progressing crushing as often as is permitted by the charge.

In order to reduce the wear on the mill housing, the said housing is lined with plates 27 which may also have a coating consisting of hard metal with embedded splinters. Likewise, the clearing blades 13 may be provided with such a coating of hard metal and embedded splinters. The effect is thus obtained that the trituration and crushing of the treated particles of material coming from the grinding gap also takes place in the annular baffle space outside the actual grinding discs.

Since a considerable comminuting work takes place in the crushing gap between the two discs, corresponding for example to a motor output of 100 kilowatts, a relatively great heating, especially of the rapidly rotating grinding disc, must be expected. To cool this disc, fresh air may be introduced, for example, through the duct 21 into the mill housing below the disc 10. This fresh air is drawn in by the fan blades 26 mounted on the counter-weight ring 12 and is forced into the annular baffle space. A constant air draught is thus set up, which passes along the lower face of the disc 10 and cools it. At the same time, the crushed material is thoroughly whirled within the baffle space by this air and blown along the coatings of the plates 27, so that a further comminuting action is thereby produced. The air sucked through the duct 21 and moved by the fan blades 26 then passes through the outlet aperture with the treated pulverous material and can be simultaneously used to convey this material.

Figure 2:
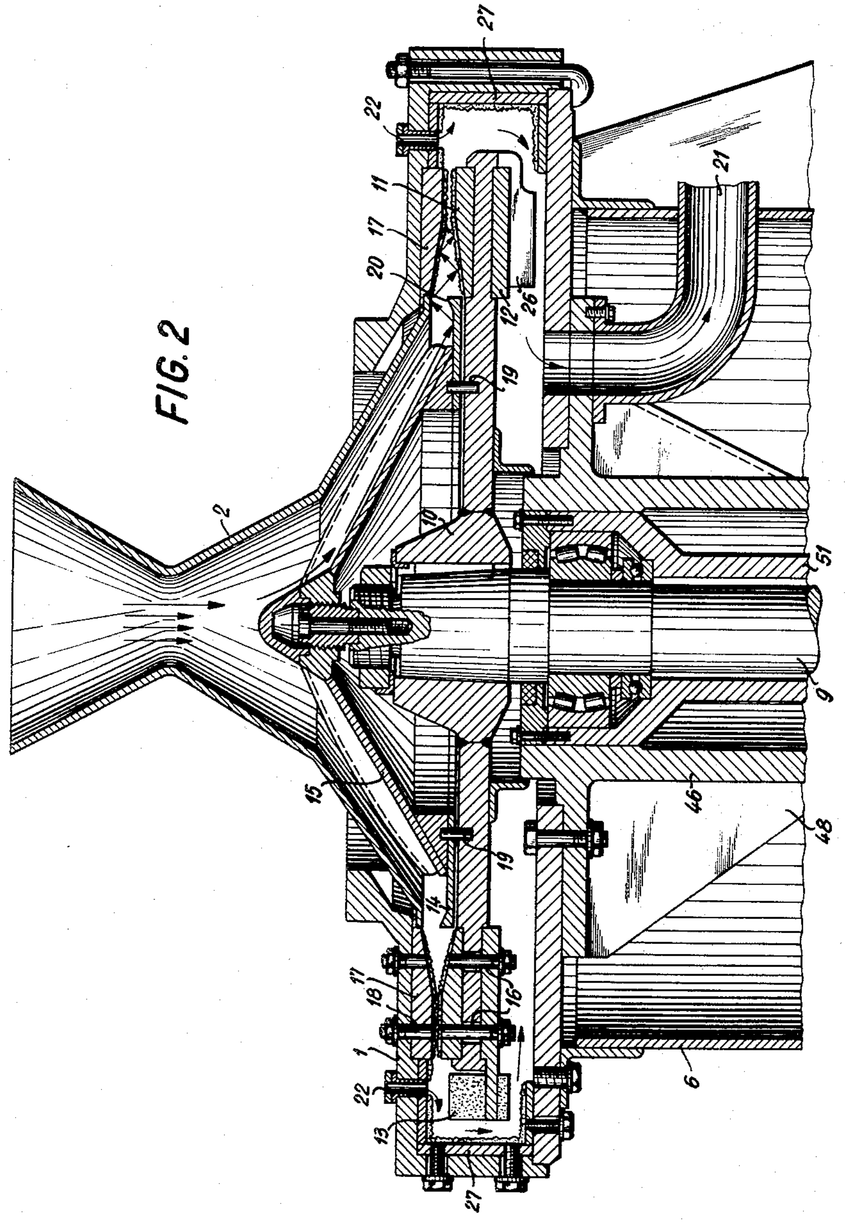
Figure 2 is a sectional view through a slightly different embodiment from that shown in Figure 1.

In the embodiment illustrated in Figure 2, the fan blades 26 are so designed that they suck air from the annular baffle space and convey it outwards through the duct 21. The air can at the same time be sucked through the grinding gap. However, in order to ensure a continuous air draught and consequent cooling of the rotating disc, there are provided outside the fixed disc in the mill housing 1 air intake apertures 22 which open into the annular baffle space. In this embodiment, the crushed material leaving the pressing gap is then thoroughly whirled in the baffle space by the air entering through the apertures 22 and is again comminuted by the coatings on the plates 27 and the clearing devices 13, whereafter it is sucked from the baffle space by the fan blades 26, and conveyed through the duct 21.

Figure 3:
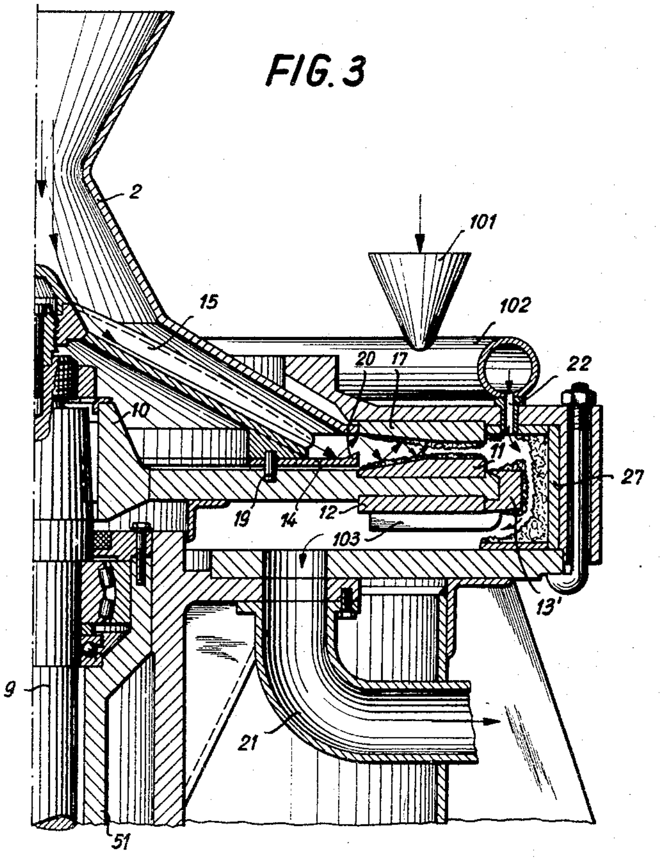
Figure 3 is a fragmentary sectional view through another form of the plane disc mill shown in Figure 1.
Figure 4:
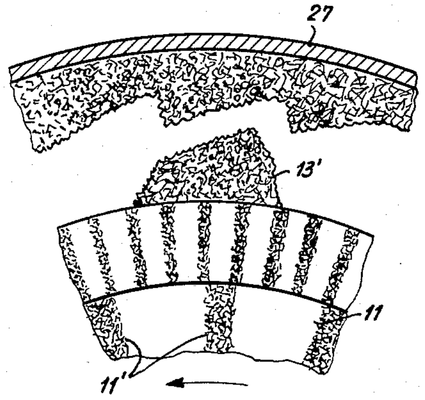
Figures 4 and 5 illustrate sections of the grinding disc, the baffle space and the housing wall of the plane disc mill shown in Figure 3.
Figure 5:
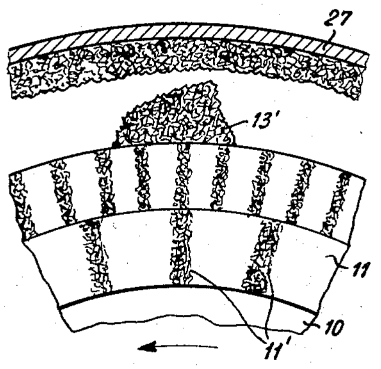

In the embodiment illustrated in Figures 3 to 5, the clearing members 13′ are designed as thick grinding jaws of substantially beak-like cross-section extending to within a short distance of the side plate 27 of the housing 1. These clearing members 13′ are again provided on their outer faces with a coating of hard metal having embedded splinters. The coating of the plates 27 of the mill housing 1 again consists of hard metal with inserted splinters. A subsequent crushing action is thus produced between the clearing members 13′ and the plates 27 of the housing 1. The coating of the plates may be of trough-shaped profile, as illustrated in Figure 4, so that the distance between the grinding jaw 13′ and the upper face of the coating of the plate 27 decreases and increases in rapid succession, whereby a considerable increase in the crushing effect is produced.

For extracting the material again treated in the annular baffle zone, a blower may be attached to delivery duct 21. The air required to convey the material is then sucked through a funnel-shaped air inlet 101 into an annular duct 102 and from this through apertures 22 in the cover plate of the mill housing 1 into the baffle space. This sucked-in air takes up particles which are sufficiently comminuted in the said baffle space, while excessively coarse particles are thrown against the coating on the plate 27 by the rapid rotational movement imparted to the material. The finely crushed material taken up by the air stream is then discharged through the duct 21 with the aid of the blower. In order again to assist the material as it passes through the mill housing below the rotating disc 10, there are attached to the lower face of the disc 10 blades 103 which throw back coarser particles of material into the baffle space in order to subject them to a further grinding action by means of the rotating jaws 13′.

Figure 6:
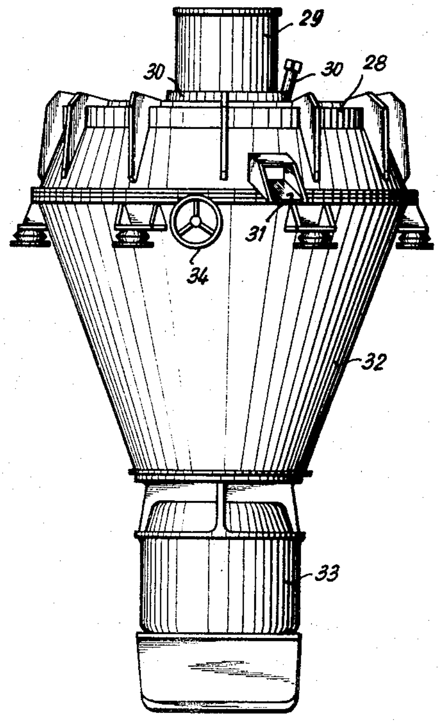
Figure 6 shows in side elevation another form of plane disc mill which is suitable especially for crushing plastic and sticky material.
Figure 7:
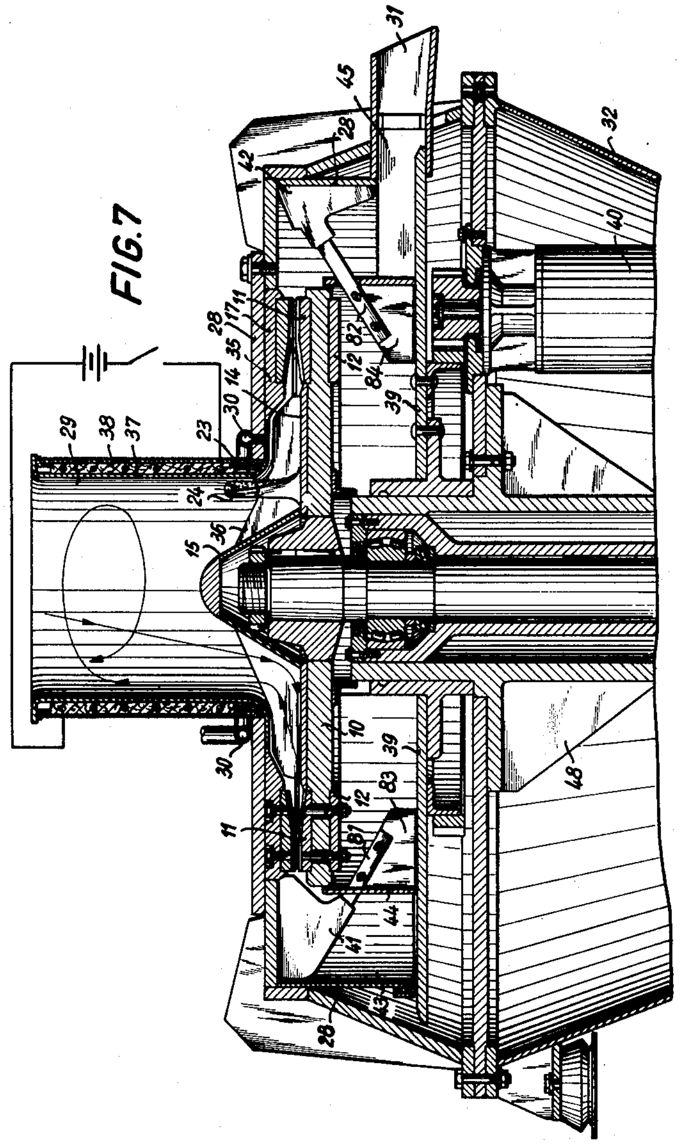
Figure 7 is a vertical sectional view of the plane disc mill shown in Figure 6.

In the embodiment shown in Figures 6 and 7, the disc mill is especially suitable for treating plastic material, for example for disintegrating clay and the like. In this embodiment also, the disc mill is mounted in a substantially cylindrical housing 28 which has a central feed duct 29 at the top. Disposed around the duct 29 is a feed duct 30 for liquid which is to be admixed with the plastic material during the crushing. The housing 28 is formed with one or more lateral radial delivery apertures 31 for the treated plastic material. The housing 28 extends downwardly into a downwardly tapering bearing housing 32 in the form of a frustum of a cone, which in turn supports on its lower edge the driving motor 33 for the disc mill. Disposed within the housing 32, adjacent the bearing of the driving shaft for the disc mill, is the device for adjusting the distance between the discs, which device is actuated by means of the hand wheel 34.

As in the embodiments illustrated in Figures 1 and 2, the plane disc mill again consists of a fixed grinding disc and a rapidly rotating grinding disc. The two discs are again horizontally mounted. The rapidly rotating grinding disc again consists of a carrier disc 10 of tough steel, on the outer edge of which are mounted the grinding coating carrier 11 and the counterweight ring 12, the reinforcing plate 14 and the intake cone 15. The fixed grinding disc again comprises the counter-grinding coating carrier 17 which, in this case, is mounted on a fixed chuck disc 35 which is secured to the upper part of the mill wall 28. The intake cone 15′ is in the present case designed somewhat more steeply than in the example of Figures 1 and 2. Mounted on the intake cone 15′ are intake blades 36 extending over the reinforcing plate 14. The intake blades 36 run with their outer part in a recess in the chuck disc 35, which is adapted to the form of the blades 36. The design of the grinding coating carrier 11 and of the counter-grinding coating carrier 17 are substantially the same as described with reference to Figures 1 and 2.

The grinding surfaces of the discs may have the grinding areas in the form of substantially radially arranged spaced ribs 11′, as shown in Figs. 4 and 5.

The feed duct 29 for the material to be treated is of cylindrical design and is lined with a smooth lining 37 preferably consisting of hard metal. The lining 37 is surrounded by an electric heating device 38. Due to this design of the supply duct 29, the plastic material is in all circumstances prevented from entirely or partially obstructing the supply duct. If plastic material is treated with an addition of liquid, a part of the liquid fed through the duct 30 returns into the feed duct 29 owing to the action of the intake blades 36 and forms on the inner side of the lining 37 a liquid film which prevents plastic material from adhering thereto. In the case of grinding without an addition of liquid, the lining 37 is heated by the electric heating device 38. As soon as parts of the plastic material are deposited on the lining 37, they are dried at the face of contact with the lining wall 37 and fall therefrom into the region of the intake blades 36.

In order to prevent the attachment of plastic material to the lower part of the lining 37, there are also mounted on the reinforcing plate 14 fingers 23 which are designed in the form of blades, but with greater rigidity. These fingers 23 are also provided with a coating 24 of hard metal having splinters embedded therein. These fingers 23 prevent the formation of annular, arched deposits of plastic material, which could not be removed by means of a liquid film or by heat.

Clay having a stiff plastic consistency can be treated in the mill of Figures 6 and 7. Even highly plastic bonding clay having a water content of less than 27% is extremely finely disintegrated without danger of obstruction. The highly wear-resistant plate coating even affords the possibility of passing clay mixed with leaning agents through the disc mill.

In the known disc mills it is possible to treat bonding clays having a water content of as little as 33%. By reason of the fact that clays having a still lower water content can be treated in the mill of Figures 6 and 7, care must be taken to ensure that no stoppages occur in the clearing zone, i.e. the space between the grinding plates and the grinding zone of the machine housing.

The clearing of the treated material may be effected in a manner now described. The base plate 39 of the housing 28 is slowly rotated by a small geared motor 40, for example at about four revolutions per minute. Mounted on the base plate 39 are the cover strippers 41 and the side strippers 42, which during the rotational movement of the base plate 39 keep the cover and the side wall of the housing 28 respectively free from treated material. The treated material thereby enters the annular space 43 defined by the base plate 39, an annular wall 44 secured to the base plate 39 and the walls of the housing 28. A fixed stripper 45 at the delivery point or points engages in the space 43 and takes up the material lying on the rotating base plate 39 and continuously discharges it.

What we claim and desire to secure by Letters Patent is:

1. A disc mill comprising a mill housing, inlet means through which material to be ground may be fed into the mill housing, outlet means through which ground material may be removed from the mill housing, a first grinding disc, said disc being planar, a second grinding disc, said second grinding disc being planar, driving means for rotating the second grinding disc, a grinding zone defined between planar surfaces of the two grinding discs, a hard metal coating on said planar surface of said first disc, said coating including a layer of hard metal having embedded splinters of metal carbide of high melting point and cobalt, segments of hard metal coating detachably connected to said planar surface of said second grinding disc, said hard metal coating including a layer of hard metal having embedded splinters of metal carbide of high melting point and cobalt, at least some of said splinters being of coarse grain and having dimensions of about 1.5 mm. to 4 mm. and a counter-weight ring detachably connected to a planar surface of the second grinding disc remote from said first-mentioned planar surface of said second grinding disc, said layer being thicker than the dimensions of the splinters and having splinters scattered therethrough with most of the splinters completely embedded in the layer and a small proportion only extending beyond the surface of the layer.

2. A disc mill as claimed in claim 1, said coating including coarse grained splinters of metal carbide of high melting point and cobalt embedded in said alloy and fine pulverous splinters of metal carbide of high melting point and cobalt embedded in said alloy between said coarse grained splinters.

3. A disc mill as claimed in claim 1, and additionally comprising clearing blades, said clearing blades being mounted on the counter-weight ring, and a coating of said hard metal alloy having said splinters embedded therein on said clearing blades.

4. A disc mill as claimed in claim 1 in which the grinding areas of said disc comprise substantially radially arranged spaced ribs.

5. In a disc mill as claimed in claim 1, said second grinding disc having substantially planar upper and lower surfaces, said segments including parts extending outwardly from one surface of the disc beyond said surface, said counterweight ring extending outwardly beyond the other surface of the disc.

6. A disc mill as claimed in claim 1, said coating including substantially finer grained splinters of metal carbide of high melting point and cobalt embedded in said alloy between said coarse grained splinters.

7. A disc mill comprising a mill housing, inlet means through which material to be ground may be fed into the mill housing, outlet means through which ground material may be removed from the mill housing, a first grinding disc, a second grinding disc, driving means for rotating the second grinding disc, clearing blades, means mounting said blades for rotary movement within the housing adjacent the internal surface of the peripheral wall thereof, a second driving means for driving the clearing blades at a lower peripheral velocity than the second grinding disc, a grinding zone defined between surfaces of the two grinding discs and a hard metal coating on each of said surfaces, said coating including a layer of hard metal having embedded splinters of metal carbide of high melting point and cobalt, said layer being thicker than the dimensions of the splinters and having splinters scattered therethrough with most of the splinters completely embedded in the layer and a small proportion only extending beyond the surface of the layer.

References Cited in the file of this patent

UNITED STATES PATENTS

| | | |
|---|---|---|
| 617,523 | Day | Jan. 10, 1899 |
| 2,022,135 | Newhouse | Nov. 26, 1935 |
| 2,243,476 | Hartmann | May 27, 1944 |
| 2,478,937 | Niethamer | Aug. 16, 1949 |
| 2,678,170 | Lee | May 11, 1954 |
| 2,703,750 | Cotter | Mar. 8, 1955 |
| 2,718,178 | Wandel | Sept. 20, 1955 |
| 2,729,146 | Wandel | Jan. 3, 1956 |

FOREIGN PATENTS

| | | |
|---|---|---|
| 322,874 | Germany | July 10, 1920 |
| 880,818 | France | Jan. 11, 1943 |